(12) United States Patent
Roberts et al.

(10) Patent No.: US 11,927,171 B2
(45) Date of Patent: Mar. 12, 2024

(54) WIND TURBINE BLADE ASSEMBLY AND METHOD FOR PRODUCING A WIND TURBINE BLADE

(71) Applicant: LM WIND POWER A/S, Kolding (DK)

(72) Inventors: David Roberts, Kolding (DK); John Korsgaard, Kolding (DK)

(*) Notice: Subject to any disclaimer, the term of this patent is extended or adjusted under 35 U.S.C. 154(b) by 56 days.

(21) Appl. No.: 17/634,823

(22) PCT Filed: Aug. 12, 2020

(86) PCT No.: PCT/EP2020/072583
§ 371 (c)(1),
(2) Date: Feb. 11, 2022

(87) PCT Pub. No.: WO2021/028461
PCT Pub. Date: Feb. 18, 2021

(65) Prior Publication Data
US 2022/0349376 A1    Nov. 3, 2022

(30) Foreign Application Priority Data

Aug. 14, 2019 (GB) .................................... 1911619

(51) Int. Cl.
*F03D 1/06* (2006.01)

(52) U.S. Cl.
CPC ......... *F03D 1/0641* (2013.01); *F03D 1/0675* (2013.01); *F05B 2230/232* (2013.01); *F05B 2240/301* (2013.01); *F05B 2240/304* (2020.08)

(58) Field of Classification Search
CPC . F03D 1/0641; F03D 1/0675; F05B 2240/304
See application file for complete search history.

(56) References Cited

U.S. PATENT DOCUMENTS

| | | | |
|---|---|---|---|
| 8,376,703 B2* | 2/2013 | Carroll ................... | F03D 1/0675 416/239 |
| 8,834,127 B2* | 9/2014 | Giguere ................ | F03D 1/0633 416/62 |
| 10,519,927 B2* | 12/2019 | Tobin .................. | B29D 99/0028 |
| 2003/0175121 A1* | 9/2003 | Shibata ................. | F03D 1/0641 416/131 |
| 2010/0143146 A1 | 6/2010 | Bell et al. | |
| 2012/0027608 A1* | 2/2012 | Martinez ............... | F03D 1/0675 416/223 R |
| 2012/0134836 A1 | 5/2012 | Carroll et al. | |
| 2013/0094970 A1 | 4/2013 | Fukami | |

(Continued)

FOREIGN PATENT DOCUMENTS

| | | |
|---|---|---|
| EP | 2341241 A1 | 7/2011 |
| EP | 2811156 A1 | 12/2014 |

(Continued)

*Primary Examiner* — Long T Tran
(74) *Attorney, Agent, or Firm* — Nath, Goldberg & Meyer; Jerald L. Meyer; Tanya E. Harkins

(57) ABSTRACT

Disclosed is a wind turbine blade assembly and a method for its manufacture. The wind turbine blade assembly comprises a leading edge, a trailing edge, a blade shell with a trailing portion, and a flatback profile component. The trailing portion has an outwardly curving arc shape and the flatback profile is positioned so as to cover the trailing portion of the blade shell.

18 Claims, 6 Drawing Sheets

(56) References Cited

U.S. PATENT DOCUMENTS

| | | | |
|---|---|---|---|
| 2013/0189103 A1* | 7/2013 | Tobin | F03D 1/065 29/889.71 |
| 2014/0032869 A1 | 1/2014 | Jennas, II et al. | |
| 2014/0093380 A1* | 4/2014 | Drobietz | F03D 1/0675 416/228 |
| 2014/0328691 A1 | 11/2014 | Hoffmann et al. | |
| 2015/0014370 A1 | 1/2015 | Kiel et al. | |
| 2015/0037112 A1* | 2/2015 | Nagabhushana | B60P 7/02 410/44 |
| 2016/0305398 A1* | 10/2016 | Carroll | F03D 1/0633 |
| 2017/0074239 A1* | 3/2017 | Caruso | B29C 66/12821 |

FOREIGN PATENT DOCUMENTS

| | | | |
|---|---|---|---|
| EP | 2735731 A1 | 5/2015 | |
| EP | 3085952 A1 | 4/2016 | |
| EP | 2195525 B1 | 10/2016 | |
| EP | 2735731 B1 | 1/2018 | |
| EP | 3085952 B1 | 1/2020 | |
| WO | 2017/039666 A1 | 3/2017 | |
| WO | 2017039666 A1 | 3/2017 | |
| WO | 2018103803 A1 | 6/2018 | |

\* cited by examiner

WIND TURBINE BLADE ASSEMBLY AND METHOD FOR PRODUCING A WIND TURBINE BLADE

This is a National Phase Application filed under 35 U.S.C. 371 as a national stage of PCT/EP2020/072583, filed Aug. 12, 2020, an application claiming the benefit of Great Britain Application No. 1911619.3, filed Aug. 14, 2019, the content of each of which is hereby incorporated by reference in its entirety.

The present invention relates to a wind turbine blade assembly and to a method of its production. The wind turbine blade assembly comprises blade shell and a flatback profile component. The profile of the wind turbine blade assembly is embodied as a flatback profile.

BACKGROUND

As wind turbines and wind turbine blades increase in size, the blade loads, i.e. strains, bending moments, peel loads etc., in particular along the trailing edge, increase. For this and other reasons, the design of the trailing edge is an important factor for the efficiency of the wind turbine.

Wind turbine blades comprising a flatback profile at the trailing edge may have an increased efficiency in some circumstances. An optimized profile comprises a varying geometry of the trailing edge along the airfoil region of the blade. A rounded corner may be required in a flatback profile which is produced as an integral part of the shell parts. This is disadvantageous for the aerodynamic properties.

Document EP 2 341 241 A1 shows a wind turbine blade with a leading edge, a trailing edge and pressure and suction shells between the leading edge and the trailing edge, wherein edges of the pressure and suction shells are configured to provide a flatted trailing edge with sharp corners can be provided. However, considerable manufacturing time is spent in configuring the joint of the pressure shell and the suction shell. Furthermore, substantial reinforcement material has to be applied in order to sustain high loads, especially for long blade lengths.

A general desire in the field of flatback wind turbine blades is to provide a flatback blade structure which sustains high mechanical forces, especially for long blade lengths.

Another general desire in the field of flatback wind turbine blades is to provide a method of assembling such a flatback blade profile which is scalable in geometry and strength.

SUMMARY

On this background, it may be seen as an object of the present disclosure to provide a wind turbine blade assembly with a flatback profile resulting in good aerodynamic properties and which sustains high mechanical loads.

Another object of the present disclosure is to provide an improved method of manufacturing a flatback wind turbine blade assembly which is scalable in geometry and strength.

One or more of these objects may be met by aspects of the present disclosure as described in the following.

A first aspect of this disclosure relates to a wind turbine blade assembly having a longitudinal axis extending between a root end to a tip end, a chord extending transversely to the longitudinal axis between a leading edge and a trailing edge, the wind turbine blade assembly comprising:
  a blade shell having a upwind shell side, a downwind shell side, a leading portion defining the leading edge of the wind turbine blade assembly, and a trailing portion arranged opposite to the leading portion and connecting the upwind shell side with the downwind shell side, wherein a cross-section of the trailing portion perpendicular to the longitudinal axis has an outwardly curving arc shape, convexly rounded shape, outwardly curving circular arc shape, outwardly curving elliptical arc shape, and/or outwardly curving C shape; and
  a flatback profile component having an upwind side positioned substantially flush with the upwind shell side, a downwind side positioned substantially flush with the downwind shell side, and a substantially planar flatback side connecting the upwind side with the downwind side, the flatback side defining the trailing edge of the wind turbine blade assembly and being shaped so as to provide the wind turbine blade assembly with a flatback airfoil shape;
wherein the flatback profile component is positioned to cover the trailing portion of the blade shell.

This may provide the advantage that the blade shell can be provided to sustain high mechanical loads as the outwardly curving arc shape of the trailing portion is a geometrical strong shape, while simultaneously providing a wind turbine blade assembly with the aerodynamic benefits associated with a flatback profile.

Furthermore, this may provide the advantage that functions of the wind turbine blade is separated so that the blade shell provides the mechanical strength to the wind turbine blade assembly and the leading portion of the airfoil shape, and the flatback assembly provides improved aerodynamic properties to the trailing portion of the airfoil shape but does not provide significant strength to the wind turbine blade assembly. This may provide the advantage that the flatback profile component can be adapted with low cost to the specific wind regime of the intended wind turbine location, and that the same blade shell can be used for multiple wind regimes thus increasing production volume and lowering costs.

Such a wind turbine blade assembly may also improve manufacturing as time spent configuring the trailing edge is minimized since the flatback profile component can be configured to be fairly simple to attach to the blade shell.

In some embodiments, the flatback profile component and the blade shell may be formed as separate components. For instance, the blade shell and the flatback profile component may be manufactured at two separate production lines or even at two different geographical locations.

This may provide the advantage that a single blade shell geometry can be utilised in multiple different wind regimes as the flatback profile component can be modified to accommodate the specific wind regime.

In some embodiments, the upwind side of the flatback profile component may be attached, preferably by thermoplastic welding, plastic welding, adhesive, and/or glue, to an outer surface of the upwind shell side, and/or the downwind side of the flatback profile component may be attached, preferably by thermoplastic welding, plastic welding, adhesive, and/or glue, to an outer surface of the downwind shell side. The outer surface of either shell side may be the surface in contact with wind.

This may be a particularly simple way of attaching the flatback profile component to the blade shell and allows the manufacture of a separate blade shell with full structural integrity before attaching of the flatback profile component.

In some embodiments, the flatback profile component may comprise a first edge between the flatback side and the upwind side of the flatback profile component and/or a second edge between the flatback side and the downwind side, wherein the first and/or the second edge may be aerodynamically sharp. In this case, the term "aerodynamically sharp" in relation to an edge may be understood as an edge adjacent to a surface wherein wind flowing along the surface substantially instantaneously separates from the surface at the aerodynamically sharp edge.

This may improve the aerodynamic properties of the wind turbine blade assembly, and since the mechanical strength is primarily provided by the blade shell, having one or more sharp edges on the flatback profile component does not compromise the mechanical strength of the wind turbine blade assembly in a significant way.

In some embodiments, the upwind shell side and the downwind shell side are formed as separate upwind and downwind shell parts, the blade shell further comprises a joint portion having an upwind joint portion formed integrally with the upwind shell part in one piece, a downwind joint portion formed integrally with the downwind shell part in one piece, and a flange adhering to an inner surface of the upwind joint portion and to an inner surface of the downwind joint portion, so as to structurally join the upwind shell part to the downwind shell part.

This may be a particularly simple and cost-effective way of joining the upwind shell side with the downwind shell side to be able to sustain high mechanical loads.

In some embodiments, in a cross-section perpendicular to the longitudinal axis, the perimeter of the trailing portion of the blade shell from the attachment of upwind side of the flatback profile component to the attachment of the downwind side of the flatback profile component may be outwardly arc shaped, convexly rounded, circular arc shaped, elliptical arc shaped, and/or C-shaped. In some embodiments, the trailing portion of the blade shell may be curving non-abruptly.

This may provide the advantage of a particularly strong geometric shape thus reducing the need for additional reinforcement at the trailing portion.

In some embodiments, the flatback profile component consists essentially of a fibre-reinforced composite material.

This may provide the advantage of a strong and light flatback profile component, furthermore this may allow the flatback profile component to be plastic welded onto the blade shell.

In some embodiments, the flatback profile component or a matrix material of the flatback material comprises or consist essentially of a thermoplastic material or a thermoset material.

This may provide the advantage of easier plastic welding the flatback profile component onto the blade shell, especially a thermoplastic material.

In some embodiments, the thickness of the upwind, downwind, and/or the flatback side of the flatback profile component is/are equal to or less than the thickness of the blade shell.

This may provide the advantage that material and thus cost is saved since the flatback profile component is primarily for improved aerodynamical properties instead of providing mechanical strength to the wind turbine blade assembly.

In some embodiments, the flatback profile component covers the trailing portion of the blade shell at least along 10%, 20%, 30%, 40%, 50%, 60%, or 70% of the distance from the root end to the tip end of the wind turbine blade assembly.

Such an extent of the flatback profile component has been found to be especially advantageous.

Some embodiments of the first aspect relate to a kit of parts for a wind turbine blade assembly, the kit of parts may comprise:
a blade shell having a upwind shell side, a downwind shell side, a leading portion defining the leading edge of the wind turbine blade assembly, and a trailing portion arranged opposite to the leading portion and connecting the upwind shell side with the downwind shell side, wherein the trailing portion has an outwardly curving arc shape, convexly rounded shape, outwardly curving circular arc shape, outwardly curving elliptical arc shape, and/or outwardly curving C shape; and
a flatback profile component having an upwind side configured for being attached substantially flush with the upwind shell side, a downwind side configured for being attached substantially flush with the downwind shell side, and a flatback side connecting the upwind side with the downwind side, the flatback side being configured to provide the wind turbine blade assembly with a flatback airfoil shape, the flatback profile component being configured for covering the trailing portion of the blade shell.

In some embodiments, a wind turbine may comprise a wind turbine blade assembly according to the first aspect of this disclosure.

In some embodiments, a wind turbine farm may comprise a plurality of wind turbines comprising a wind turbine blade assembly according to the first aspect of this disclosure.

A second aspect of this disclosure relates to a method for manufacturing a wind turbine blade assembly according to the first aspect of this disclosure, the wind turbine blade assembly having a longitudinal axis extending between a root end to a tip end, a chord extending transversely to the longitudinal axis between a leading edge and a trailing edge, the method comprising the steps of:
providing a blade shell having an upwind shell side, a downwind shell side, a leading portion defining the leading edge, and a trailing portion arranged opposite to the leading portion and connecting the upwind shell side with the downwind shell side, wherein the trailing portion has an outwardly curving arc shape, convexly rounded shape, outwardly curving circular arc shape, outwardly curving elliptical arc shape, and/or outwardly curving C shape;
providing a flatback profile component having an upwind side, a downwind side, and a flatback side connecting the upwind side with the downwind side;
positioning the flatback profile component to cover the trailing portion of the blade shell so that the flatback side defines the trailing edge of the wind turbine blade assembly;
attaching, preferably by thermoplastic welding, plastic welding, adhesive, and/or glue, the upwind side of the flatback profile component to the upwind shell side, so that the upwind side of the flatback profile component is positioned substantially flush with the upwind shell side; and
attaching, preferably by thermoplastic welding, plastic welding, adhesive, and/or glue, the downwind side of the flatback profile component to the downwind shell side, so that the downwind side of the flatback profile component is positioned substantially flush with the downwind shell side.

This may provide the advantage that the blade shell can be provided separately from the flatback profile component and thus increases manufacturing flexibility, for instance the flatback profile component may be attached to the blade shell after the blade shell has been moved from the mould allowing lowering production time for the blade shell.

A person skilled in the art will appreciate that any one or more of the above aspects of this disclosure and embodiments thereof may be combined with any one or more of the other aspects of this disclosure and embodiments thereof.

BRIEF DESCRIPTION OF DRAWINGS

Embodiments of this disclosure will be described in more detail in the following with regard to the accompanying figures. The figures show one way of implementing the present invention and are not to be construed as being limiting to other possible embodiments falling within the scope of the attached claim set.

DETAILED DESCRIPTION

Figure 1:
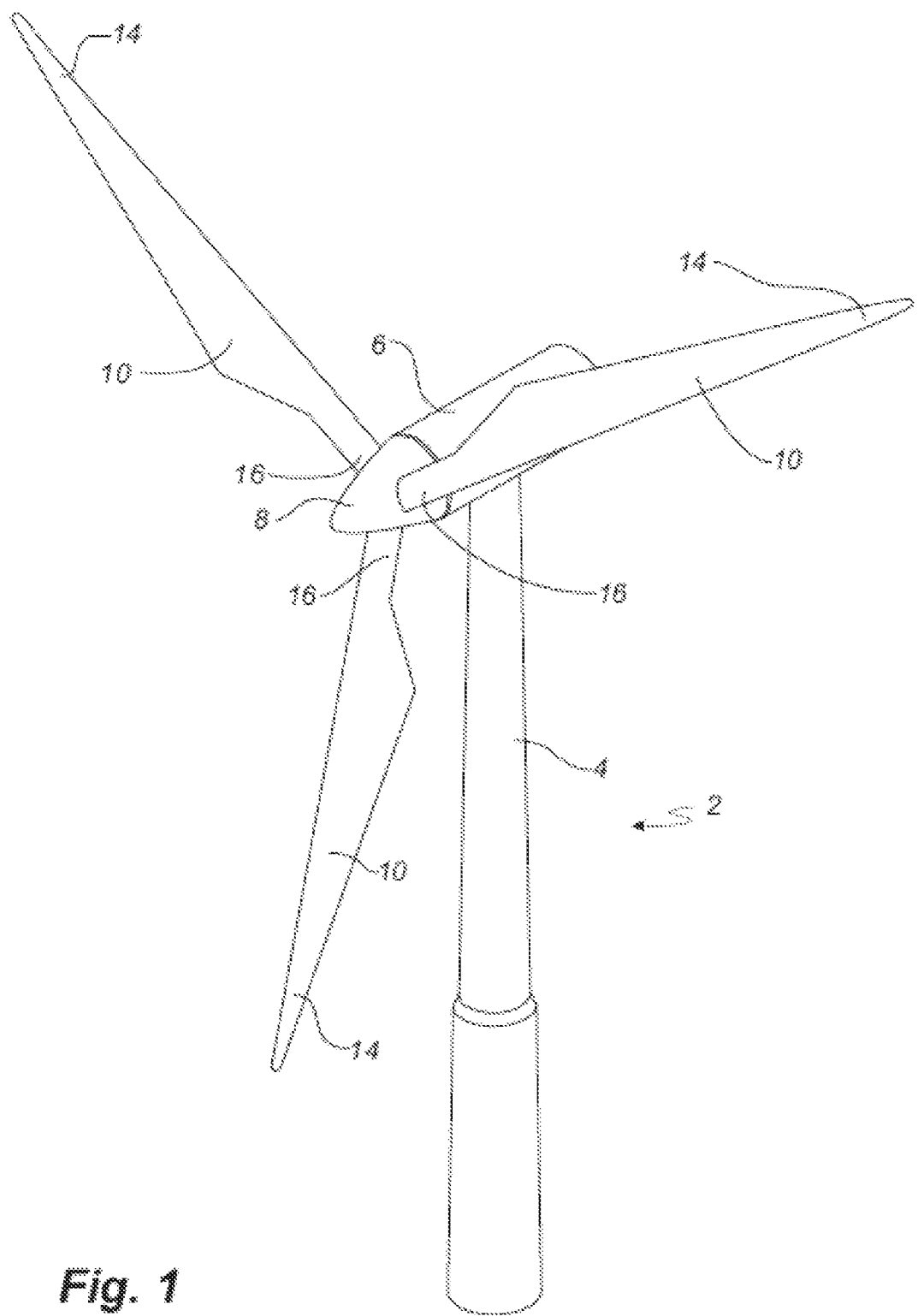
FIG. 1 is a schematic view illustrating an exemplary wind turbine.

FIG. 1 illustrates a conventional modern upwind wind turbine 2 according to the so-called "Danish concept" with a tower 4, a nacelle 6, and a rotor with a substantially horizontal rotor shaft. The rotor includes a hub 8, and three blade assemblies 10 extending radially from the hub 8, each having a blade root 16 nearest the hub and a blade tip 14 furthest from the hub 8.

Figure 2:
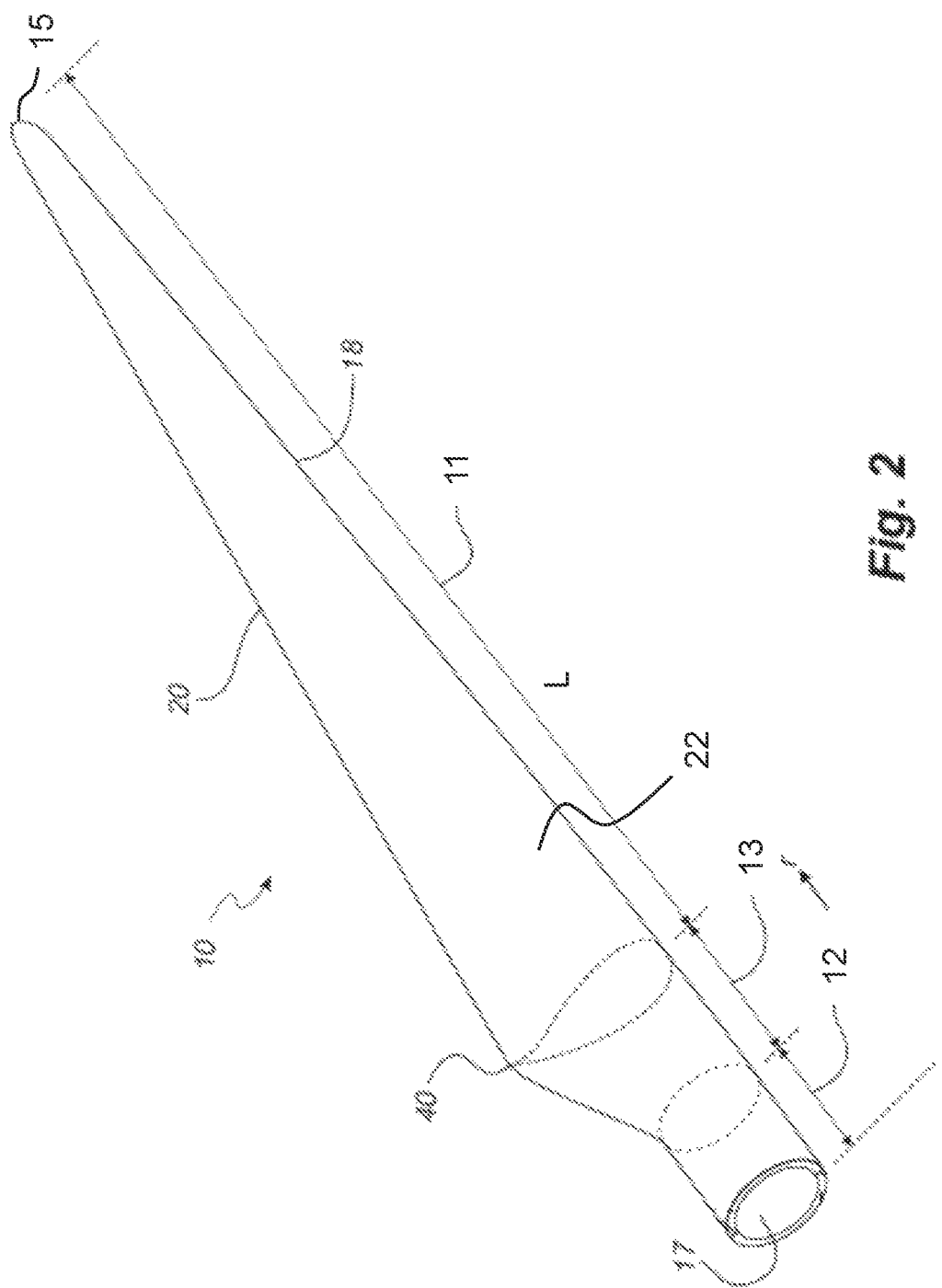
FIG. 2 is a schematic view illustrating an exemplary wind turbine blade.

FIG. 2 shows a schematic view of an exemplary wind turbine blade assembly 10. The wind turbine blade assembly 10 extends along a longitudinal axis L with a root end 17 and a tip end 15 and has the shape of a conventional wind turbine blade with comprises a root region 12 closest to the hub, a profiled or an airfoil region 11 furthest away from the hub and a transition region 13 between the root region 12 and the airfoil region 11. The blade assembly 10 comprises a leading edge 18 facing the direction of rotation of the blade assembly 10, when the blade is mounted on the hub, and a trailing edge 20 facing the opposite direction of the leading edge 18.

The airfoil region 11 (also called the profiled region) has an ideal or almost ideal blade shape with respect to generating lift, whereas the root region 12 due to structural considerations has a substantially circular or elliptical cross-section, which for instance makes it easier and safer to mount the blade assembly 10 to the hub. The diameter (or the chord) of the root region 12 may be constant along the entire root area 30. The transition region 13 has a transitional profile gradually changing from the circular or elliptical shape of the root region 12 to the airfoil profile of the airfoil region 11. The chord length of the transition region 13 typically increases with increasing distance r from the hub. The airfoil region 11 has an airfoil profile with a chord extending between the leading edge 18 and the trailing edge 20 of the blade assembly 10. The width of the chord decreases with increasing distance r from the hub.

A shoulder 40 of the blade assembly 10 is defined as the position, where the blade assembly 10 has its largest chord length. The shoulder 40 is typically provided at the boundary between the transition region 13 and the airfoil region 11.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

Figure 3:
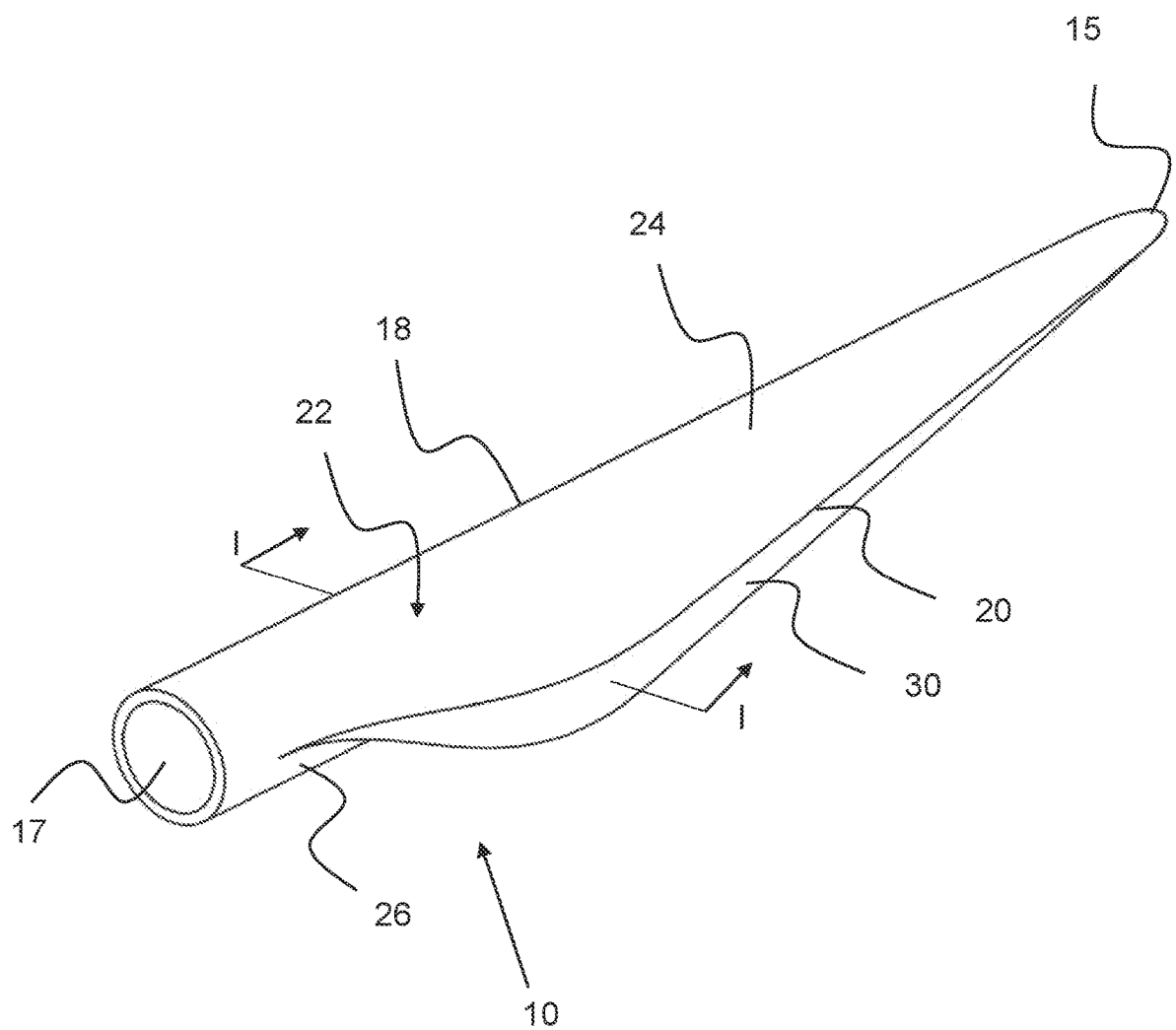
FIG. 3 is a schematic view showing a wind turbine blade with a flatback profile at the trailing edge in more detail.

The trailing edge 20 may be embodied as a flatback trailing edge, wherein the trailing edge 20 is flattened in order to achieve better aerodynamic properties. This construction may increase the aerodynamic efficiency of the wind turbine blade in comparison with a sharp trailing edge design. FIG. 3 shows a wind turbine blade assembly 10 with a flatback profile at the trailing edge 20 in more detail. The wind turbine blade assembly 10 comprises a blade shell 22 including two blade shell parts, a first blade shell part 24 and a second blade shell part 26, typically made of fibre-reinforced polymer. The first blade shell part 24 is typically a pressure or upwind blade shell part. The second blade shell part 26 is typically a suction or downwind blade shell part. The first blade shell part 24 and the second blade shell part are typically glued together along bond lines or glue joints 28 extending along the trailing edge 20 and the leading edge 18 of the blade assembly 10 as shown in more detail on FIG. 5. Typically, the root end 17 of the blade shell parts 24, 26 have a semi-circular or semi-oval outer cross-sectional shape.

The trailing edge 20 has a flattened profile. The flattened profile may increase the aerodynamic efficiency and also helps to reduce the chord width. The flatback profile is provided by a flatback profile component 30 which connects the upwind side shell part 24 to the downwind side shell part 26. In the present embodiment, the flatback profile component 30 extends substantially along the entire length of the trailing edge 20, however in other embodiments, the flatback profile component 30 may extend at least along 10%, 20%, 30%, 40%, 50%, 60%, or 70% of the distance from the root end 17 to the tip end 15 of the wind turbine blade assembly 10. Details of this flatback profile component 30 and the method for manufacturing the wind turbine blade assembly 10 will be explained in more detail with reference to the following drawings.

Figure 4:
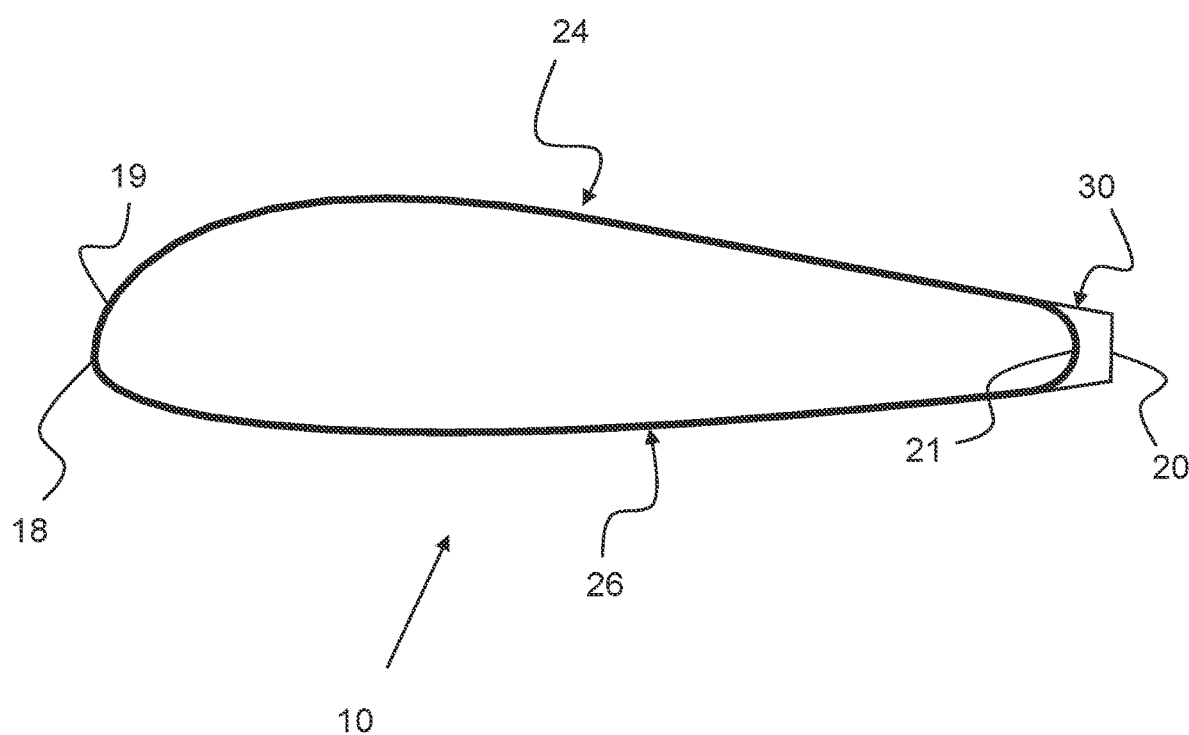
FIG. 4 is a schematic view of a cross-section perpendicular to the longitudinal axis of the blade shell with an attached flatback profile component.

FIG. 4 shows a flatback airfoil profile of the wind turbine blade assembly 10 in a cross-section perpendicular to the longitudinal axis L along lines I-I shown in FIG. 3. The wind turbine blade assembly 10 comprises the upwind blade shell part 24, the blade shell part 26, and the flatback profile component 30 which were formed as separate components. The blade shell parts 24, 26 has been joined at a trailing portion 21 of the blade shell parts 24, 26 to form an integral blade shell 24, 26 which will be discussed in more detail in connection with FIG. 6. A leading portion 19 of the blade shell includes the leading edge 18 of the blade assembly 10 and a trailing portion 21 of the blade shell 24, 26 is covered by the flatback profile component 30 which shaped so as to provide the wind turbine blade assembly 10 with a flatback airfoil shape with a flattened trailing edge 20.

Figure 5:
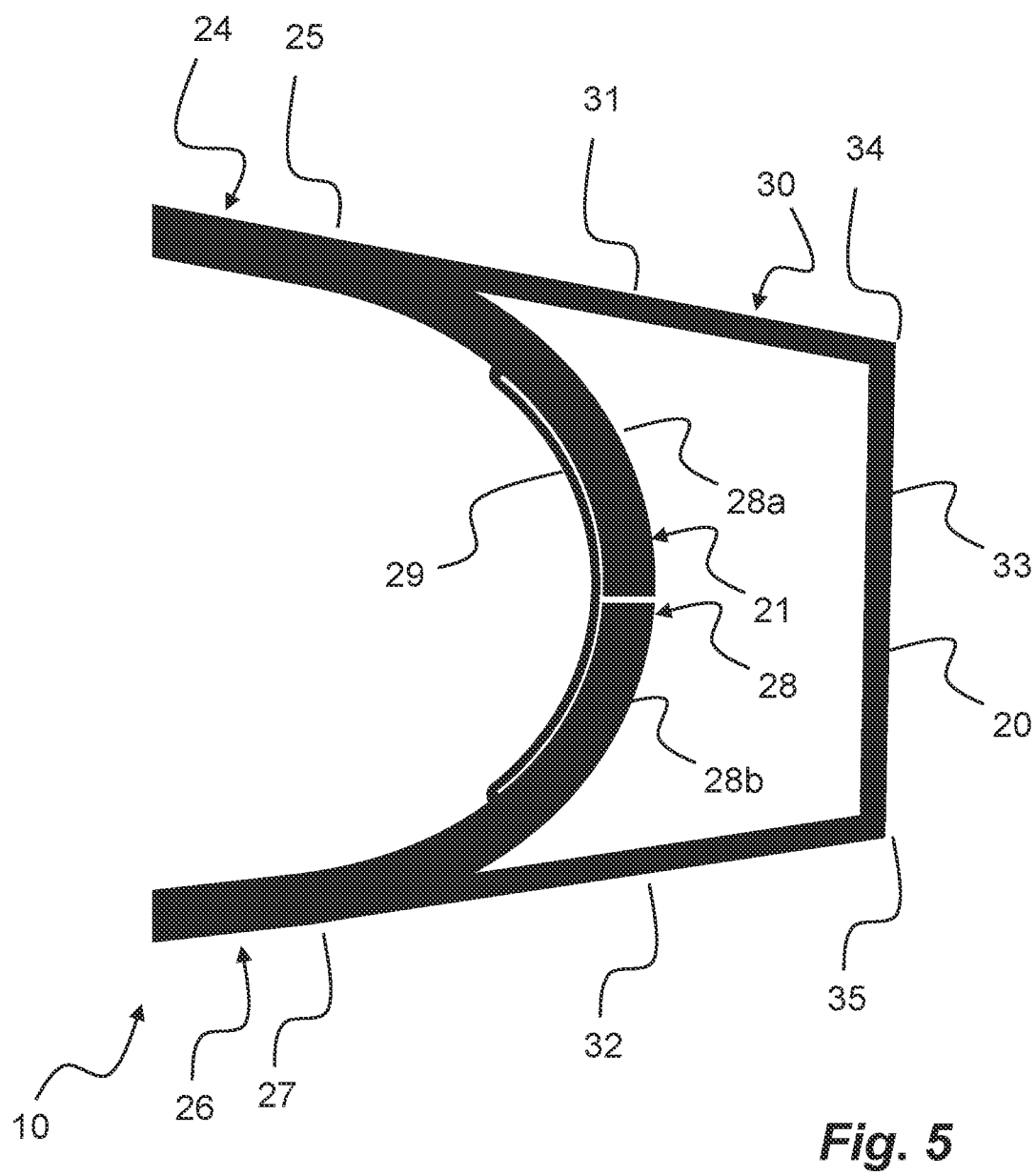
FIG. 5 is a schematic view showing the trailing portion of the wind turbine blade assembly in more detail.

FIG. 5 shows the trailing portion 21 of the blade shell 24, 26 and the flatback profile component 30 in more detail. The trailing portion 21 of the blade shell 24, 26 has an outwardly curving arc shape substantially in the shape of a C. This geometric shape sustains loads much better relative to a more typical airfoil with an aerodynamically sharp trailing edge which substantially has the shape of a >. The flatback profile component 30 has an upwind side 31 positioned substantially flush with the upwind shell side 24, a downwind side 32 positioned substantially flush with the downwind shell side 26, and a substantially planar flatback side 33 connected to the upwind side 31 at an upwind edge 34 and to the downwind side 32 at a downwind edge 35. The flatback side 33 defines the trailing edge 20 of the wind turbine blade assembly 10. The upwind edge 34 and the downwind edge 35 are aerodynamically sharp so that wind traversing the edges 34, 35 substantially instantaneously separates from the respective flatback side 33 at the aerodynamically sharp edge 34, 35.

The blade shell parts are made of fibre-reinforced plastic, typically a thermoplastic or thermoset polymer with carbon or glass fibre-reinforcement, usually wrapped around a core, often of balsa wood, to form a sandwich structure. The flatback profile component 30 advantageously consist essentially of the same material as the blade shell parts 24, 26, however typically the flatback profile component 30 is formed as a non-sandwich structure. In particular, the thickness of the upwind 31, downwind 32, and/or the flatback side 33 of the flatback profile component 30 is/are usually equal to or less than the thickness of the blade shell 24, 26.

Typically, the upwind side 31 of the flatback profile component 30 is adhered to an outer surface 25 of the upwind shell side part 24, and the downwind side 32 of the flatback profile component 30 is adhered to an outer surface 27 of the downwind shell side 26. In other embodiments, the upwind 31 and downwind 32 side are plastic welded onto the respective outer surfaces 25, 27.

The blade shell 24, 26 comprises a joint portion 28 having an upwind joint portion 28a formed integrally with the upwind shell part 24 in one piece, a downwind joint portion 28b formed integrally with the downwind shell part 26 in one piece, and a flange 29 extending in parallel by and slightly offset to the trailing portion 21 of blade shell parts 24, 26. The flange 29 adheres to an inner surface of the upwind joint portion 28a and to an inner surface of the downwind joint portion 28b, so as to structurally join the upwind shell part 24 to the downwind shell part 26. In the present embodiment, the joint portion 28 is positioned at the trailing portion 21, but in other embodiments, the joint portion 28 may be positioned away from the trailing portion 21, for instance on the upwind or downwind side of the blade shell 24, 26.

Figure 6:
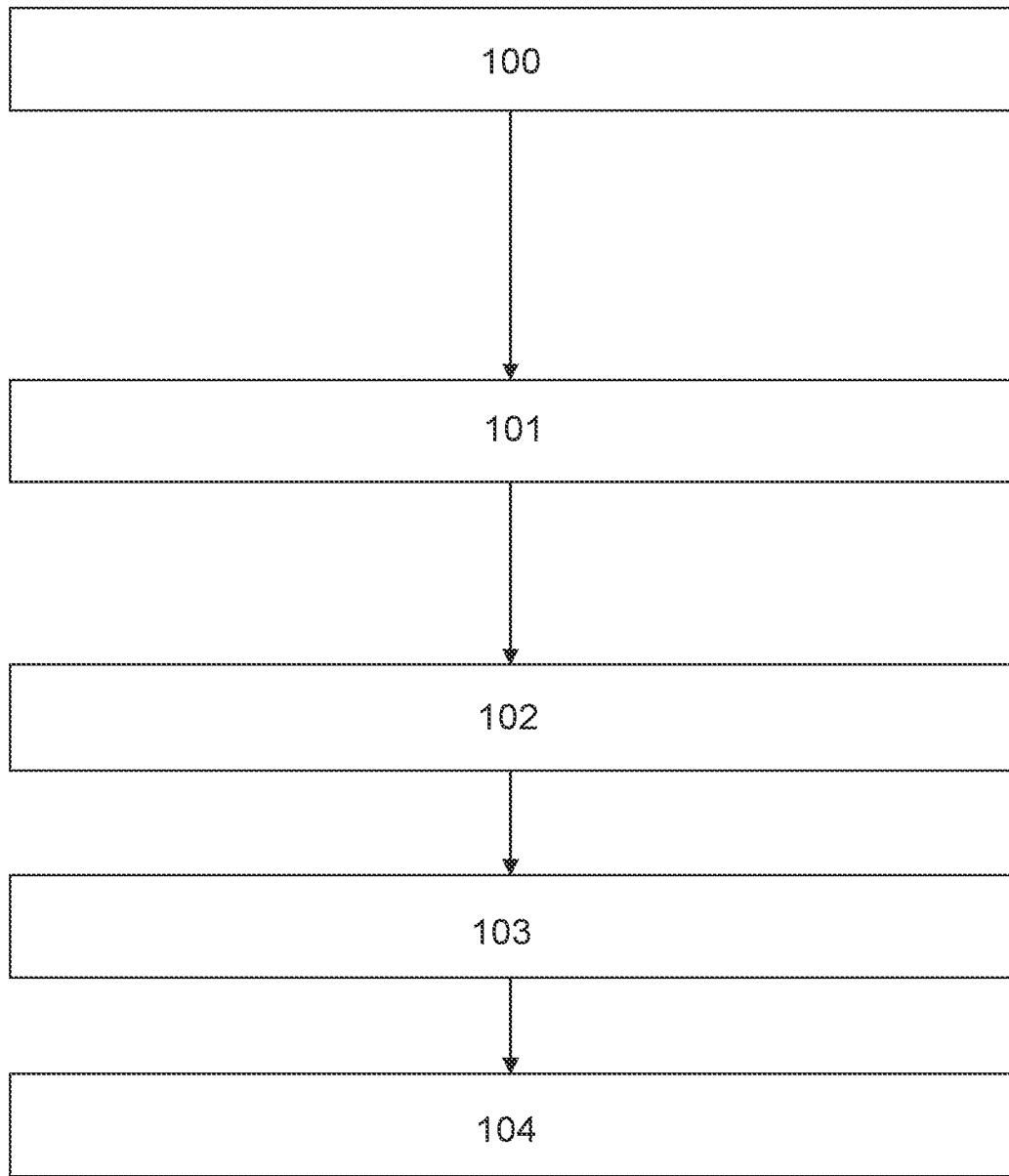
FIG. 6 is flowchart of an exemplary method for manufacturing a wind turbine blade assembly.

FIG. 6 is a flowchart showing the steps of producing a wind turbine blade according to a detailed embodiment.

Firstly 100, a blade shell 24, 26 is provided, typically in an upwind blade shell part 24 and a downwind blade shell part 26 joined at a joint portion 28. The blade shell 24, 26 has an upwind shell side 24, a downwind shell side 26, a leading portion 19 defining a leading edge 18, and a trailing portion 21 arranged opposite to the leading portion 19 and connecting the upwind shell side 24 with the downwind shell side 26. The trailing portion 21 has an outwardly curving arc shape.

Secondly 101, a flatback profile component 30 is provided. The flatback profile component 30 has an upwind side 31, a downwind side 32, and a flatback side 33 connecting the upwind side 31 with the downwind side 32.

Thirdly 102, the flatback profile component 30 is positioned to cover the trailing portion 21 of the blade shell 24, 26 so that the flatback side 33 defines the trailing edge 20 of the wind turbine blade assembly 10.

Fourthly 103, the upwind side 31 of the flatback profile component 30 is attached, preferably by thermoplastic welding, plastic welding, adhesive, and/or glue, to the upwind shell side 24, so that the upwind side 31 of the flatback profile component 30 is positioned substantially flush with the upwind shell side 24.

Fifthly 104, the downwind side 32 of the flatback profile component 30 is attached, preferably by thermoplastic welding, plastic welding, adhesive, and/or glue, to the downwind shell side 26, so that the downwind side 32 of the flatback profile component 30 is positioned substantially flush with the downwind shell side 26.

Due to the fact, that the blade shell 24, 26 is manufactured in a different step than the flatback profile component 30, the blade shell 24, 26 can form the structural basis of many different wind turbine blade assemblies since a number of different flatback profile components 30 can be produced to correspond to different wind regimes.

The invention has been described with reference to preferred embodiments. However, the scope of the invention is not limited to the illustrated embodiments, and alterations and modifications can be carried out without deviating from the scope of the invention.

LIST OF REFERENCES

2 wind turbine
4 tower
6 nacelle
8 hub
10 blade assembly
11 airfoil region
12 root region
13 transition region
14 blade tip
15 tip end
16 blade root
17 root end
18 leading edge
19 leading portion
20 trailing edge
21 trailing portion
22 blade shell
24 first/lower blade shell part (upwind/pressure side shell part)
25 outer surface
26 second/upper blade shell part (downwind/suction side part)
27 outer surface
28 joint portion
28a upwind joint portion
28b downwind joint portion
29 flange
30 flatback profile component
31 upwind side
32 downwind side
33 flatback side
34 upwind edge
35 downwind edge
40 shoulder
100 providing a blade shell
101 providing a flatback profile component
102 positioning the flatback profile component to cover the trailing portion
103 attaching the upwind side to the upwind shell side
104 attaching the downwind side to the downwind shell side

The invention claimed is:

1. A wind turbine blade assembly having a longitudinal axis extending between a root end to a tip end, a chord extending transversely to the longitudinal axis between a leading edge and a trailing edge, the wind turbine blade assembly comprising:
- a blade shell having an upwind shell side, a downwind shell side, a leading portion defining the leading edge of the wind turbine blade assembly, and a trailing portion arranged opposite to the leading portion and connecting the upwind shell side with the downwind shell side, wherein a cross-section of the trailing portion perpendicular to the longitudinal axis having an outwardly curving arc shape, wherein the upwind shell side and the downwind shell side are formed as separate upwind and downwind shell parts, the blade shell further comprising a joint portion having an upwind joint portion formed integrally with the upwind shell part in one piece, a downwind joint portion formed integrally with the downwind shell part in one piece, and a flange adhering to an inner surface of the upwind joint portion and to an inner surface of the downwind joint portion, so as to structurally join the upwind shell part to the downwind shell part; and
- a flatback profile component having an upwind side positioned substantially flush with the upwind shell side, a downwind side positioned substantially flush with the downwind shell side, and a substantially planar flatback side connecting the upwind side with the downwind side, the flatback side defining the trailing edge of the wind turbine blade assembly and being shaped so as to provide the wind turbine blade assembly with a flatback airfoil shape;
- wherein the flatback profile component is positioned to cover the trailing portion of the blade shell.

2. The wind turbine blade assembly according to claim 1, wherein the flatback profile component and the blade shell are formed as separate components.

3. The wind turbine blade assembly according to claim 1, wherein the upwind side of the flatback profile component is attached to an outer surface of the upwind shell side, and/or wherein the downwind side of the flatback profile component is attached to an outer surface of the downwind shell side.

4. The wind turbine blade assembly according to claim 3, wherein the upwind side of the flatback profile component is attached by thermoplastic welding, plastic welding, adhesive, and/or glue to the outer surface of the upwind shell side.

5. The wind turbine blade assembly according to claim 3, wherein the downwind side of the flatback profile component is attached by thermoplastic welding, plastic welding, adhesive, and/or glue to the outer surface of the downwind shell side.

6. The wind turbine blade assembly according to claim 1, wherein the flatback profile component comprises a first edge between the flatback side and the upwind side of the flatback profile component and/or a second edge between the flatback side and the downwind side, wherein the first and/or the second edge is/are aerodynamically sharp.

7. The wind turbine blade assembly according to claim 1, wherein, in a cross-section perpendicular to the longitudinal axis, the perimeter of the trailing portion of the blade shell from the attachment of upwind side of the flatback profile component to the attachment of the downwind side of the flatback profile component is outwardly arc shaped, convexly rounded, circular arc shaped, elliptical arc shaped, and/or C-shaped.

8. The wind turbine blade assembly according to claim 1, wherein the trailing portion of the blade shell is curving non-abruptly.

9. The wind turbine blade assembly according to claim 1, wherein the flatback profile component consists essentially of a fibre-reinforced composite material.

10. The wind turbine blade assembly according claim 1, wherein the flatback profile component or a matrix material of the flatback material comprises or consist essentially of a thermoplastic material or a thermoset material.

11. The wind turbine blade assembly according to claim 1, wherein the thickness of the upwind, downwind, and/or the flatback side of the flatback profile component is/are equal to or less than the thickness of the blade shell.

12. The wind turbine blade assembly according to claim 1, wherein the flatback profile component covers the trailing portion of the blade shell at least along 10%, 20%, 30%, 40%, 50%, 60%, or 70% of the distance from the root end to the tip end of the wind turbine blade assembly.

13. A wind turbine comprising a wind turbine blade assembly according to claim 1.

14. A wind turbine farm comprising a plurality of wind turbines according to claim 13.

15. A method for manufacturing a wind turbine blade assembly according to claim 1, the wind turbine blade assembly having a longitudinal axis extending between a root end to a tip end, a chord extending transversely to the longitudinal axis between a leading edge and a trailing edge, the method comprising the steps of:
- providing a blade shell having an upwind shell side, a downwind shell side, a leading portion defining the leading edge, and a trailing portion arranged opposite to the leading portion and connecting the upwind shell side with the downwind shell side, wherein the trailing portion has an outwardly curving arc shape, wherein the upwind shell side and the downwind shell side are formed as separate upwind and downwind shell parts, the blade shell further comprising a joint portion having an upwind joint portion formed integrally with the upwind shell part in one piece, a downwind joint portion formed integrally with the downwind shell part in one piece, and a flange adhering to an inner surface of the upwind joint portion and to an inner surface of the downwind joint portion, so as to structurally join the upwind shell part to the downwind shell part;
- providing a flatback profile component having an upwind side, a downwind side, and a flatback side connecting the upwind side with the downwind side;
- positioning the flatback profile component to cover the trailing portion of the blade shell so that the flatback side defines the trailing edge of the wind turbine blade assembly;
- attaching the upwind side of the flatback profile component to the upwind shell side, so that the upwind side of the flatback profile component is positioned substantially flush with the upwind shell side; and
- attaching the downwind side of the flatback profile component to the downwind shell side, so that the downwind side of the flatback profile component is positioned substantially flush with the downwind shell side.

16. The method according to claim 15, wherein the step of attaching the upwind side of the flatback profile component to the upwind shell side comprises attaching the upwind side of the flatback profile component to the upwind shell side by thermoplastic welding, plastic welding, adhesive, and/or glue.

17. The method according to claim 15, wherein the step of attaching the downwind side of the flatback profile component to the downwind shell side comprises attaching the downwind side of the flatback profile component to the downwind shell side by thermoplastic welding, plastic welding, adhesive, and/or glue.

18. A kit of parts for a wind turbine blade assembly, comprising:

- a blade shell having an upwind shell side, a downwind shell side, a leading portion defining the leading edge of the wind turbine blade assembly, and a trailing portion arranged opposite to the leading portion and connecting the upwind shell side with the downwind shell side, wherein the trailing portion has an outwardly curving arc shape, wherein the upwind shell side and the downwind shell side are formed as separate upwind and downwind shell parts, the blade shell further comprising a joint portion having an upwind joint portion formed integrally with the upwind shell part in one piece, a downwind joint portion formed integrally with the downwind shell part in one piece, and a flange adhering to an inner surface of the upwind joint portion and to an inner surface of the downwind joint portion, so as to structurally join the upwind shell part to the downwind shell part; and
- a flatback profile component having an upwind side configured for being attached substantially flush with the upwind shell side, a downwind side configured for being attached substantially flush with the downwind shell side, and a flatback side connecting the upwind side with the downwind side, the flatback side being configured to provide the wind turbine blade assembly with a flatback airfoil shape, the flatback profile component being configured for covering the trailing portion of the blade shell.

* * * * *